No. 859,999. PATENTED JULY 16, 1907.
F. WERNER.
MACHINE FOR MAKING COOKIES.
APPLICATION FILED JULY 27, 1906.

2 SHEETS—SHEET 1.

WITNESSES:
Palmer A. Jones.
Georgiana Chace

INVENTOR:
Frank Werner
By Luther V. Moulton
His Attorney

No. 859,999. PATENTED JULY 16, 1907.
F. WERNER.
MACHINE FOR MAKING COOKIES.
APPLICATION FILED JULY 27, 1906.

2 SHEETS—SHEET 2.

WITNESSES:
Palmer A. Jones.
Georgiana Chace.

INVENTOR:
Frank Werner
By Luther V. Moulton
His Attorney.

UNITED STATES PATENT OFFICE.

FRANK WERNER, OF GRAND RAPIDS, MICHIGAN.

MACHINE FOR MAKING COOKIES.

No. 859,999.  Specification of Letters Patent.  Patented July 16, 1907.

Application filed July 27, 1906. Serial No. 328,105.

*To all whom it may concern:*

Be it known that I, FRANK WERNER, a citizen of the United States, residing at Grand Rapids, in the county of Kent and State of Michigan, have invented certain new and useful Improvements in Machines for Making Cookies; and I do hereby declare the following to be a full, clear, and exact description of the invention, such as will enable others skilled in the art to which it appertains to make and use the same.

My invention relates to improvements in machines for making cookies, or other like articles of plastic material; and its object is to provide a machine that will automatically form the dough or other material and discharge the same upon pans carried by the machine, and to provide the device with various new and useful features hereinafter more fully described and particularly pointed out in the claims.

Figure 1:
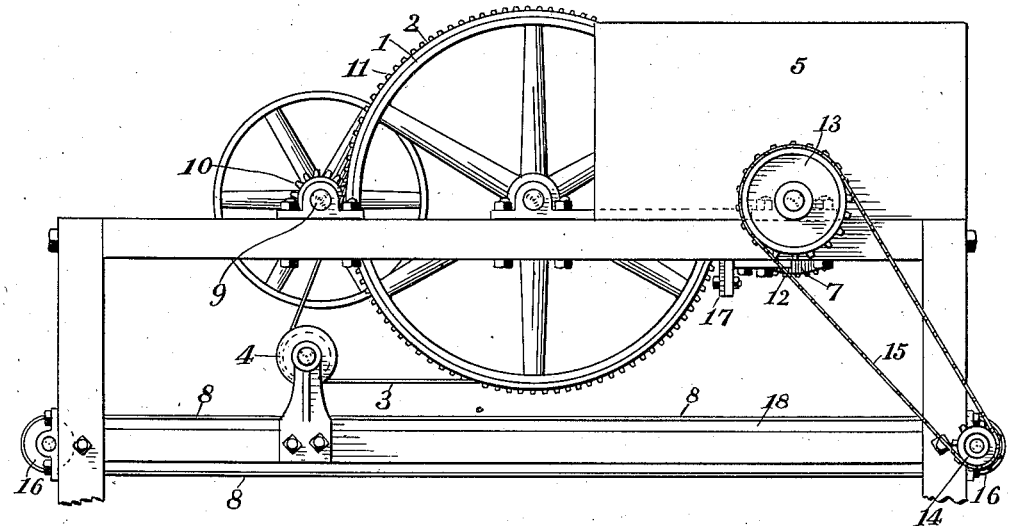
Figure 2:
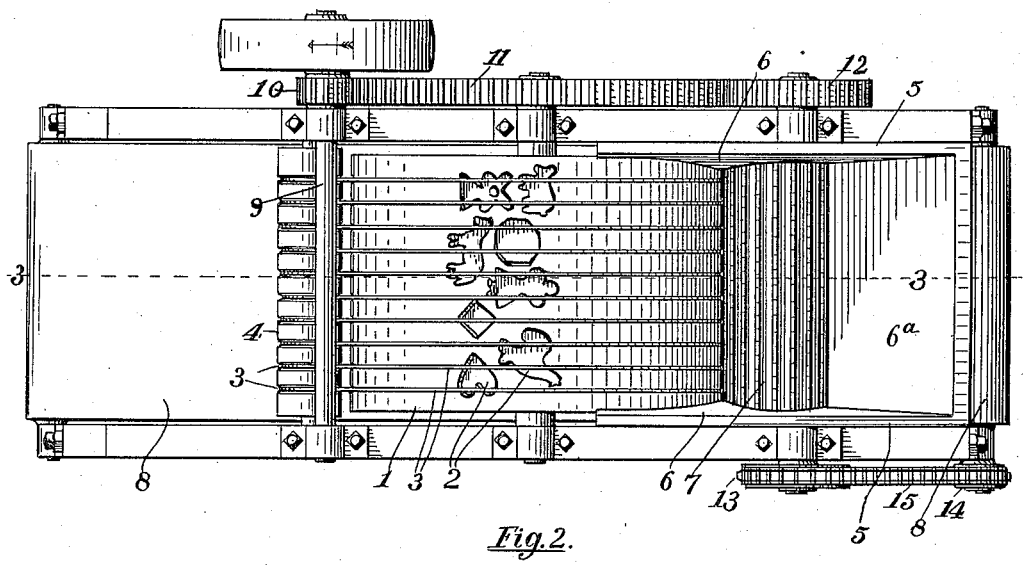
Figure 3:
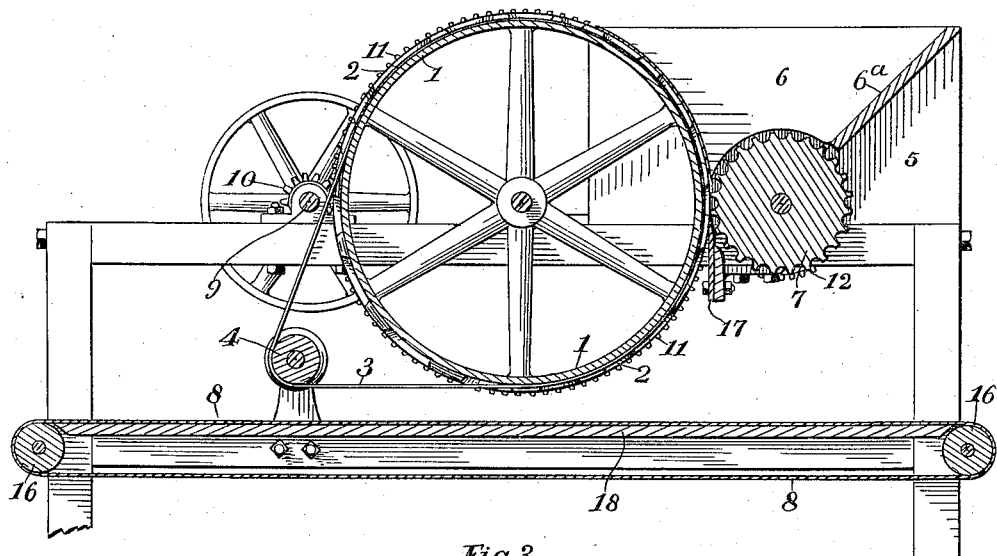
Figure 4:
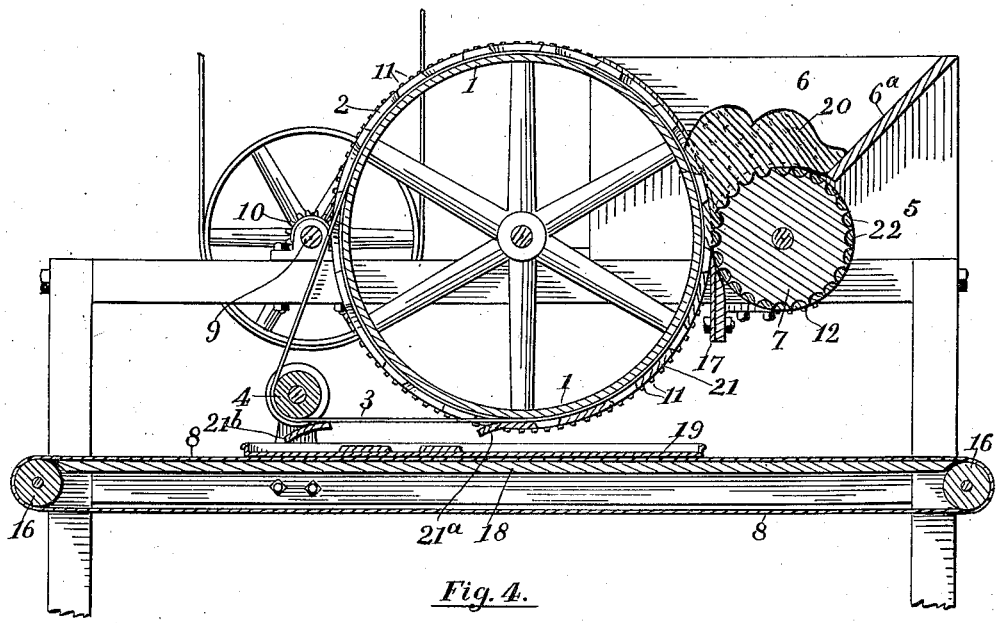

My invention consists essentially of a cylinder having molds or recesses thereon, and circumferential grooves extending through the bottom of the recesses, together with wires or belts in the grooves for discharging the material from the recesses, a fluted roll for pressing a portion of the material into the molds or recesses and returning the excess to the hopper and in various features of construction and arrangement as will more fully appear by reference to the accompanying drawings, in which:

Figure 1 is a side elevation of a machine embodying my invention; Fig. 2. is a plan view of the same; Fig. 3. a longitudinal vertical section of the same on the line 3—3 of Fig. 2; and, Fig. 4. the same showing the device in operation.

Like numbers refer to like parts in all of the figures.

1 represents a cylinder having on its surface recesses 2 of various forms corresponding to the shape of the cakes to be formed therein. At intervals in the cylinder are circumferential grooves extending through these recesses wherein are endless small belts 3 preferably of wire, which extend horizontally and tangentially from the under side of the cylinder to a grooved roll 4, and thence extending upward into the grooves of the cylinder 1.

5 is a hopper in which the dough or other material is placed, which hopper has converging sides 6 fitting between the cylinder 1 and a fluted roll 7 arranged adjacent to the cylinder and in the open bottom of the hopper. The end 6ª of the hopper is also inclined and terminates near the fluted roll 7. A horizontally moving belt 8 extends beneath the cylinder 1 and is spaced apart therefrom to carry the trays 19 to receive the cakes 21ª and 21ᵇ as they are discharged from the recesses in the cylinder. This belt slides over the bed 18 and extends over rolls 16 at the respective ends of the machine, and is also moved by one of the rolls. To rotate the cylinder, a driving shaft 9 is provided having a driving pulley mounted thereon, and provided with a driving pinion 10 which engages a gear 11 fixed on the shaft of the cylinder 1 and a gear 12 on the shaft of the fluted roll 7 is engaged and driven by this gear 11. On the said shaft of the roll 7 is mounted a sprocket wheel 13 which is connected with a sprocket wheel 14 on the shaft of one of the rolls 16 by means of a chain 15. The gear 11 is of the same pitch diameter as the cylinder 1, the gear 12, the same pitch diameter as the fluted roll 7, and the sprocket wheels 13 and 14, are of the relative proportions of the fluted rolls 7 and the roll 16, whereby the surface of the cylinder, the fluted roll, and the belt 8 all move at substantially the same speed. A knife 17 is supported beneath the line of contact between the cylinder 1 and the fluted roll 7 with its edge in close proximity to the said line.

In operation the dough or other material is placed in the hopper and rests upon the fluted roll 7, the inclined sides of the hopper directing the material between the said roll and the cylinder 1, where it is crushed between the same and forced into the recesses of the cylinder and the flutes of the roll. Being severed by the knife 17 at the surface of the cylinder, the contents of the recesses are retained therein and the dough in the flutes of the roll will adhere thereto and be carried around beneath the lower edge of the side 6ª of the hopper and again pressed into the mass of dough within the hopper. The contents of the recesses constitute the various molded cakes and are removed therefrom by means of the wires or belts 3 as the same leave the cylinder tangentially to pass to the roll 4. In the event that the cakes should adhere to the wires, the roll 4 being grooved to receive the same will press the cakes off the wires and drop them in proper place upon the tray, which tray being moved at the same rate of the cylinder will receive the cakes as they drop from the same, each in its proper relation to the other in the same order as the recesses of the cylinder are arranged.

What I claim is:

1. In a machine for molding cookies, the combination of a roll adapted to retain the surplus dough severed from the dough in the recesses of the cylinder and return the same to the hopper, a cylinder arranged in close relation to the roll and having recesses to receive the dough and form the cookies, a hopper to direct the dough between the roll and cylinder, and having a bottom opening closed by the roll means for severing the dough at the surface of the cylinder, and means for removing the dough from the recesses in the cylinder and close to the roll.

2. In a machine for molding cookies, a hopper having a bottom opening, a roll having flutes to retain the surplus dough upon the roll and closing the said opening, a cylinder arranged in close relation to the roll and hopper and provided with recesses to receive the dough and form the cookies, means for discharging the cookies from said recesses, and a knife supported with its edge close between the roll and cylinder and in close relation to the surface of the cylinder.

3. In a machine for molding cookies, a bed plate, a belt to carry trays slidable on the bed plate, a cylinder above the belt and having recesses and circumferential grooves, a roll above the belt and spaced apart from the cylinder, belts engaging the grooves in the cylinder and the roll, a fluted roll close to the cylinder and adapted to retain the surplus dough, a hopper above the roll and having inwardly inclined sides, a knife arranged with its edge between the cylinder and the fluted roll, and means for rotating the cylinder, the fluted roll and the belt at the same surface speed.

4. In a cooky molding machine, the combination of a cylinder having recesses and circumferential grooves in its surface, a roll having grooves opposite the grooves in the cylinder, and spaced apart therefrom, belts engaging the grooves in the cylinder and roll, a fluted roll close to the cylinder, a hopper above said roll, a bed plate below the cylinder, a belt traversing said bed plate and engaging rolls at the respective ends of the machine, gears of the respective diametrical pitch of the cylinder and the fluted roll and connecting the same, sprocket wheels and chains connecting the fluted roll with one of the belt rolls, and a knife arranged with its edge between the cylinder and the fluted roll.

In testimony whereof I affix my signature in presence of two witnesses.

FRANK WERNER.

Witnesses:
PALMER A. JONES,
LUTHER V. MOULTON.